Nov. 19, 1940. G. H. JOHNSON 2,221,800
CLUTCH PLATE
Filed Oct. 25, 1939 2 Sheets-Sheet 1
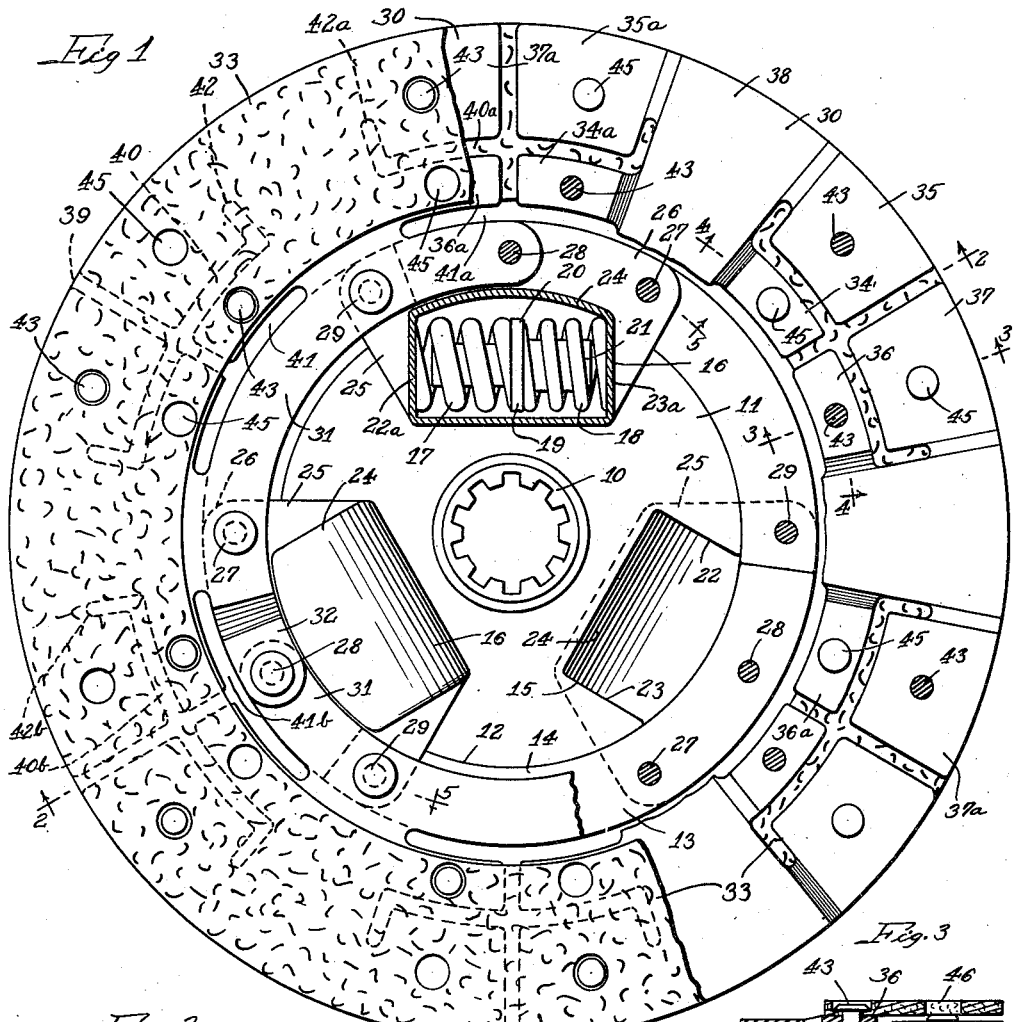
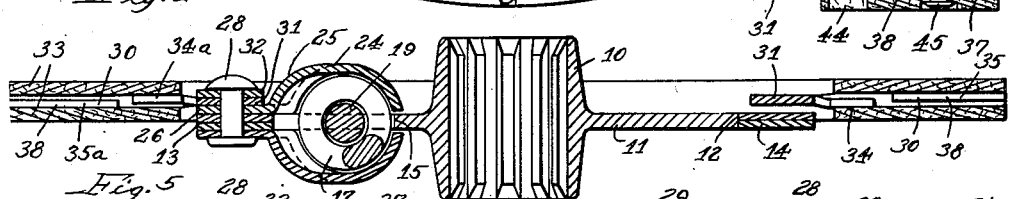
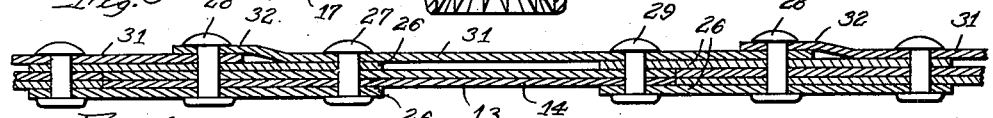
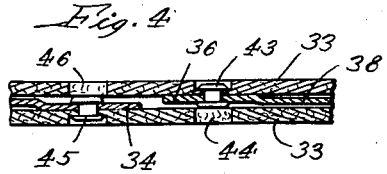
Inventor:
George H. Johnson
By McCanna, Wintercorn & Morsbach
Attys.

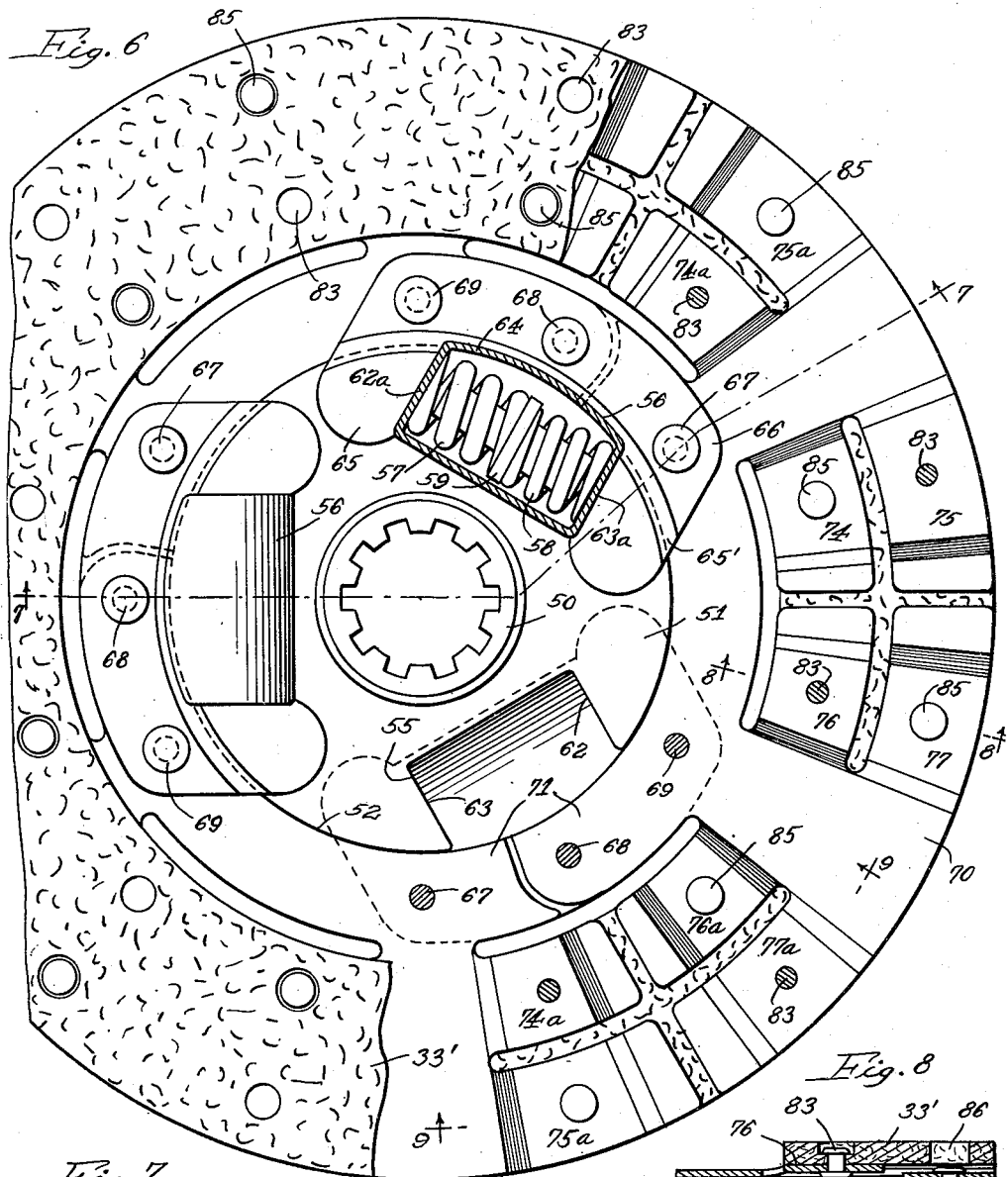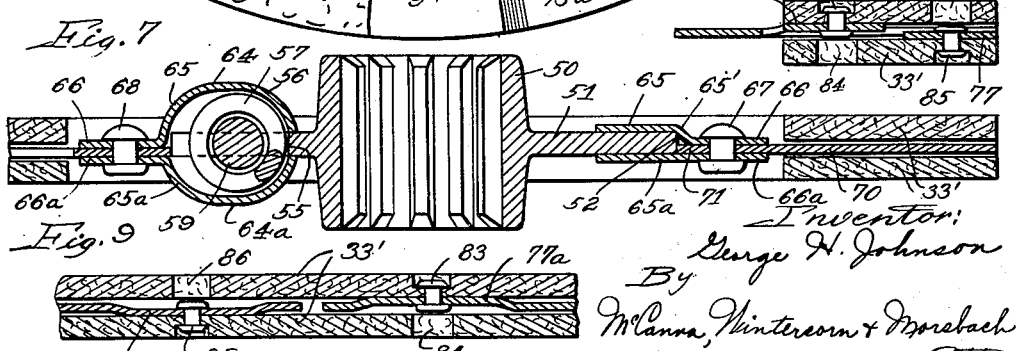

Patented Nov. 19, 1940

2,221,800

UNITED STATES PATENT OFFICE 2,221,800

CLUTCH PLATE

George H. Johnson, Rockford, Ill.

Application October 25, 1939, Serial No. 301,241

15 Claims. (Cl. 192—68)

This invention relates to clutches for motor vehicles and is particularly concerned with improvements in the type of clutch plate disclosed in the copending application of W. Vincent Thelander, Serial No. 189,817, filed February 10, 1938.

The plate disclosed in the application mentioned comprises, briefly stated, a center hub having an annular flange around which are mounted a plurality of plate sections some with portions abutting the front face of the flange and others abutting the rear face to prevent axial displacement of the hub with respect to the plate sections, the plate sections being secured together and carrying rings of friction material on opposite sides thereof and also cooperating with spring means active between the flange on the hub and those portions of the plate sections abutting the same to resiliently transmit drive between the hub and plate sections. Now, while a clutch plate of that construction represents an important advance in the art, by reason of the economy realized by the use of a multiplicity of identical interchangeable small sheet metal stampings which it is possible to produce at greatly reduced cost because of the greatly diminished amount of waste in material, there are nevertheless certain objections to that kind of construction which it is the principal object of my present invention to eliminate, with a view to producing a still better clutch plate at a further reduction in cost.

The clutch plate described requires the forming of substantially semi-cylindrical spring pockets in those portions of the clutch plate sections having abutment with the opposite sides of the hub flange. On the other hand, it is desired to provide a so-called "mush" effect in the marginal mat-holding portions of the plate either by slotting and forming these portions to provide spring tongues or by attaching to these portions spring members to give the desired effect. The use of separate springs leads to too many complications and added cost, and it has therefore been the desire to provide spring tongues as integral portions of the plate sections. There, however, a further difficulty presented itself because spring steel stock suitable for the forming of the spring tongues was found to tear easily and cause great difficulty in the drawing of those portions to form the spring pockets. Moreover, the subsequent heat treating of the spring steel stock it was found gave rise to considerable difficulty in maintaining flatness of flat sections and uniformity of shape in curved sections, due to the distortion incident to heat treating. The salient feature of my invention lies in the provision of a clutch plate of the kind described having the spring pocketed portions of the plate structurally separate and independent of the mat-holding portions but connected together circumferentially with respect to the hub flange, the first portions being of deep draw or mild steel to permit easily drawing the same to provide the spring pockets, whereas the other portions are of spring steel stock suitable for the provision of spring tongues required for the mush effect. A plate constructed along these lines, besides avoiding the objections mentioned as being present in former constructions, can be produced at lower cost because of the reduction in the amount of spring steel stock required and the use of cheaper mild steel for those portions heretofore made of the spring steel stock.

The invention is illustrated in the accompanying drawings, in which—

Fig. 1 is a face view of a clutch plate made in accordance with my invention, showing one of the spring pockets in outside elevation, a second in longitudinal section, and a third broken away to show the registering notch in the hub flange, a portion also of the friction mat being broken away to show the slotting and bending of the marginal portion of the plate for mush effect;

Fig. 2 is a cross-section on the line 2—2 of Fig. 1;

Figs. 3, 4, and 5 are all sectional details on the correspondingly numbered lines in Fig. 1;

Fig. 6 is a view similar to Fig. 1 showing a modified or alternative construction;

Fig. 7 is a cross-section on the broken line 7—7 of Fig. 6, and

Figs. 8 and 9 are sectional details on the lines 8—8 and 9—9 of Fig. 6.

Similar reference numerals are applied to corresponding parts throughout the views.

Referring first to Figs. 1 to 5, the clutch plate shown comprises relatively rotatable inner and outer portions, the inner portion being formed by a center hub 10 splined for driving connection with the driving shaft of the transmission and provided with an annular flange 11 onto which the outer portion of the plate is adapted to be assembled in engagement with the circular periphery 12. A ring 13, which may be of any suitable construction, but which is herein shown as made up of six arcuate interchangeable sheet metal punchings 14 disposed in two layers, three in a layer, is approximately equal in thickness to the flange 11 and has an easy working fit on the circular periphery 12 thereof. Small punchings like the punchings 14 can be produced at a small fraction of the cost of complete rings, and for that reason a built-up sectional construction is shown and preferred. Three or more notches 15 are provided in the flange 11, one for each of a plurality of spring pockets indicated generally by the numeral 16, the present plate having three notches for as many pockets. The ring 13 extends across the outer end of each notch 15, as clearly appears in Fig. 1. The pockets 16 form housings for the spring cushioning means which in conformity with the application previously mentioned consists of a set of heavy coiled compression springs 17, a set of light coiled compression springs 18 and intermediate thrust members 19, each pocket containing one heavy spring 17 and one light spring 18 with a thrust member 19 therebetween, the springs being on opposite sides of the annular flange 20 provided intermediate the ends of the thrust member 19. The member 19 provides opposed axially aligned stem portions 21 fitting inside the springs 17 and 18, as shown.

The ends 22 and 23 of the notches 15 form driving faces, and the corresponding end walls 22a and 23a of the pockets 16 also form driving faces for cooperation with the opposite ends of the spring cushioning means enclosed in the pockets and notches registering therewith. In the present case, each of the pockets 16 is formed by a pair of registering struck out substantially semi-cylindrical hollow bosses 24 disposed on opposite sides of the flange 11, each of these bosses 24 being provided on a separate segmental-shaped sheet metal stamping 25. The stampings 25, which are made from a deep draw or mild steel best suited for that purpose, are formed to provide arcuate attaching flanges 26 on the outer periphery thereof, their outer radius being preferably the same as the outer radius of the punchings 14 forming the ring 13, as shown. Three rivets 27, 28, and 29 serve to fasten the stampings 25 by means of their flanges 26 onto opposite sides of the ring 13 and at the same time to fasten the punchings 14 in assembled relation to form the ring 13. The flanges 26 overlap the abutting ends of the punchings 14 so that two of the three rivets holding the two stampings 25 for each pocket 16 pass through the end portion of one punching 14 and the other rivet passes through the adjacent end of the next punching, and so on. The rivets 27—29 also serve to join other segmental-shaped sheet metal stampings 30 to the ring 13 by means of their inner arcuate attaching flanges 31 which overlie the outer attaching flanges 26 of the stampings 25 on one side of the flange 11 (see Fig. 2). To insure good circumferential alignment of the stampings 30 and accurate concentricity thereof with relation to the hub 10, the attaching flange 31 on each stamping 30 is made long enough to have four rivets passed through each, two of each four being identified with each of the adjoining stampings 25, one end 32 of each of the flanges 31 being bent into offset relation to the plane of the rest of the flange, as clearly appears in Fig. 5, to overlap the adjoining end of the flange 31 on the next stamping 30. The overlapping of the ends of the flanges 31 at 32 occurs at the middle of each of the flanges 26, as clearly indicated in Figs. 1 and 5, the rivet 28 passing through and connecting these overlapped ends in each instance. The stampings 30 provide the mat-holding outer portion of the plate on which is applied the annular facings 33 of suitable composition material usually containing asbestos. The stampings 30, in accordance with the present invention, are made from spring steel stock suitable for the provision of spring tongues required for the mush effect desired between the facings 33. In other words, the stampings 25 for the spring pockets 16 are of deep draw or mild steel suited for that particular purpose, whereas the stampings 30 in which the spring tongues are provided for mush effect are of spring steel stock especially suited for that particular purpose, thus avoiding all of the difficulties mentioned above where the pockets and spring tongues were provided in portions of the same pieces.

The stampings 30 are herein disclosed as formed to provide groups of spring tongues, each numbered 34 to 37, similarly arranged as in the copending application first mentioned, but, of course, it will be evident that any suitable or preferred formation of the outer mat-holding portions 38 of these stampings for mush effect may be used, the thought being to provide axially spaced portions on opposite sides of an intermediate plane which, when the facings 33 are subjected to pressure between the pressure plate of the clutch and the flywheel, are adapted to yield and move toward coplanar relationship, thereby affording gradual engagement of the clutch and eliminating objectionable grab. In accordance with the disclosure of the earlier application, the mat-holding portions 38 of the stampings 30 are slotted radially substantially through the middle thereof, as indicated at 39, intersecting two arcuate concentric slots 40 and 41, the latter being next to and defining the outer periphery of a portion of the attaching flange 31. In the present construction, both ends of the outer mat-holding portion 38 of each of the stampings 30 are also slotted arcuately at 40a, 41a, and 40b and 41b on the same radii with the slots 40 and 41, respectively. The ends of the slots 40 remote from the slots 39 have radial extensions 42, and the same is true of the slots 40a and 40b, as indicated at 42a and 42b, respectively. These radial extensions of the arcuate slots 40, 40a, and 40b make for greater flexibility of the tongues 35 and 37 at the middle of each mat-holding portion 38 and the related tongues 35a and 37a at the opposite ends of each mat-holding portion 38, and assures keeping the facings 33 always in true parallelism so that the facings will wear uniformly and have proportionately longer life. Naturally the true parallelism of the facings which gives the advantages mentioned also gives the advantage of better clutch engagement and consequently less slippage, and that in turn means further decreased wear and longer life. The section Fig. 3 shows that the tongues 36 are struck out from the plane of the mat-holding portions 38 in one direction while the tongues 37 are struck out in the opposite direction. The section Fig. 4 also shows that the tongues 34 are struck from the plane of the mat-holding portions 38 in the same direction as the tongues 37, namely, in the opposite direction from the tongues 36 and 35, the tongues 34 and 37 being in one plane and the tongues 35 and 36 in the other plane. Tongues 34a and 35a at one end of each of the mat-holding portions 38 are struck in opposite directions with respect to the plane of the mat-holding portions, the tongues 34a being in the same plane with the tongues 36 and the tongues 35a in the same plane with the tongues 37. The tongues 36a and 37a at the opposite ends of the mat-holding portions 38 are, respectively, in the same planes with the tongues 34 and 35, and accordingly are struck in the opposite directions with relation to the tongues 34a and 35a on the next adjoining stamping 30. Rivets 43 at the centers of the tongues 34a, 35, 36, and 37a serve to secure the facing 33 to one side of the clutch plate and there are holes 44 in alignment with these rivets in the other facing 33 so as not to interfere with the yielding of the spring tongues when the facings 33 are subjected to compression between the pressure plate and flywheel in the engagement of the clutch. Other rivets 45 on the tongues 35a, 34, 37, and 36a on each of the mat-holding portions 38 serve to secure the other facing 33 to the clutch plate, and there again there are holes 46 provided in the first-mentioned facing on the opposite side of the clutch plate in alignment with these rivets so as not to interfere with the yielding of the spring tongues. The relationship of these two sets of rivets 43 and 45 to the holes 44 and 46, respectively, is clearly illustrated in Figs. 3 and 4.

The clutch plate shown in Figs. 6 to 9 is generally similar to the one just described. The hub 50 has a flange 51 with a circular periphery 52. Notches 55 are provided in the flange 51 in register with spring pockets 56 containing the spring cushioning means consisting of springs 57 and 58 and intermediate thrust members 59. The ends 62 and 63 of the notches 55 cooperate with the end walls 62a and 63a of the spring pockets 56 to provide abutments for the opposite ends of the spring cushioning means 57—59 to provide a resilient drive between the hub and plate. The pockets 56 are provided by struck-out generally cylindrical hollow bosses 64 and 64a on sheet metal stamping 65 and 65a made from deep draw mild steel. The stampings 65 and 65a in the present construction are alike except for the fact that the arcuate attaching flanges 66 on the stampings 65 are offset with relation to the open sides of the pocket portions 64, as indicated at 65' in Figs. 6 and 7, whereas the arcuate attaching flanges 66a on the stampings 65a are in coplanar relation with the open sides of the pocket portions 64a, as clearly appears in Fig. 7. This difference is necessitated in the present construction because of the elimination of the filler ring 13 used in the other construction, the present plate having the stampings 70 that carry the facings 33' assembled circumferentially around the periphery 52 of the flange 51 to take the place of the ring 13 by having the arcuate attaching flanges 71 of the stampings 70 riveted directly between the attaching flanges 66 and 66a of the stampings 65 and 65a, as indicated at 67, 68 and 69. Three rivets 67, 68, and 69 are provided in connection with each of the spring pockets to fasten the two stampings 65 and 65a together by means of their attaching flanges 66 and 66a, the last-mentioned flanges being in overlapping relation to adjoining ends of attaching flanges 71, as clearly appears in Fig. 6, so that one of the rivets 67 passes through the end of one of these flanges and the other two rivets 68 and 69 pass through the adjoining end of the next flange 71, and so on. The stampings 70 are therefore held in true concentricity with relation to the flange 51 and hub 50 and also with relation to the spring pockets 56 provided by the stampings 65 and 65a.

The stampings 70 are, of course, made of spring steel struck like the stampings 30 in the other plate, with the same objects in view. The stampings 70 like the stampings 30 each provides eight spring tongues thereon, four at the middle, as indicated at 74, 75, 76 and 77, and two at each end, as indicated at 74a, 75a, 76a and 77a. The tongues 74a, 75, 76, and 77a are all struck up from the plane of the plate in Fig. 6 and have rivets 83 fastening the same to the facing 33', holes 84 being provided in the other facing 33' in alignment with these rivets so as not to interfere with deflection of the spring tongues when the facings are subjected to compression between a pressure plate and flywheel in the engagement of a clutch. The other spring tongues 75a, 74, 77, and 76a are all struck downwardly from the plane of the plate, as seen in Fig. 6, and have rivets 85 for fastening the same to the other facing, there being holes 86 in the first-named facing in alignment with these rivets so as not to interfere with yield of the spring tongues in the engagement of the clutch.

It is believed the foregoing description conveys a good understanding of the objects and advantages of my invention. The appended claims have been drawn with a view to covering all legitimate modifications and adaptations.

I claim:

1. A clutch plate comprising a center hub having an annular flange, a plurality of clutch plate sections circumferentially arranged around the flange, the flange having circumferentially spaced openings provided therein, spring means disposed in said openings for resiliently transmitting drive between the plate sections and the flange, a plurality of circumferentially spaced spring housing plates disposed on opposite sides of the flange covering the openings and enclosing said spring means, said housing plates being arranged for engagement with the spring means to transmit drive between the plate sections and flange, said spring housing plates having the radially outer portions thereof overlapping the radially inner portions of the clutch plate sections, and means for securing the plate sections together and to said spring housing plates to form an annulus concentric with the hub and flange, said plate sections being adapted to carry friction material on the radially outer portions thereof.

2. A clutch plate comprising a center hub having an annular flange, a plurality of clutch plate sections circumferentially arranged around the flange, the flange having circumferentially spaced openings provided therein, spring means disposed in said openings for resiliently transmitting drive between the plate sections and the flange, a plurality of circumferentially spaced spring housing plates disposed on opposite sides of the flange covering the openings and enclosing said spring means, said housing plates being arranged for engagement with the spring means to transmit drive between the plate sections and flange, said spring housing plates having the radially outer portions thereof overlapping the radially inner portions of the clutch plate sections, means for securing the plate sections together and to said spring housing plates to form an annulus concentric with the hub and flange, and rings of friction material supported on opposite sides of the annulus in substantially concentric relation with the hub and secured to all of said plate sections.

3. A clutch plate comprising a center hub having an annular flange, a plurality of clutch plate sections circumferentially arranged around the flange, the flange having circumferentially spaced openings provided therein, spring means disposed in said openings for resiliently transmitting drive between the plate sections and the flange, a plurality of circumferentially spaced spring housing plates disposed on opposite sides of the flange covering the openings and enclosing said spring means, said housing plates being arranged for engagement with the spring means to transmit drive between the plate sections and flange, said spring housing plates having the radially outer portions thereof overlapping the opposite sides of the radially inner portions of the clutch plate sections and disposed so that each pair of associated housing plates spans the adjoining ends of adjacent clutch plate sections, and means for securing the associated pairs of spring housing plates together with the clutch plate sections held therebetween so as to form an annulus substantially concentric with the hub, the clutch plate sections being adapted to carry friction material on the radially outer portions thereof.

4. A clutch plate comprising a center hub having an annular flange, a plurality of clutch plate sections circumferentially arranged around the flange, the flange having circumferentially spaced openings provided therein, spring means disposed in said openings for resiliently transmitting drive between the plate sections and the flange, a plurality of circumferentially spaced spring housing plates disposed on opposite sides of the flange covering the openings and enclosing said spring means, said housing plates being arranged for engagement with the spring means to transmit drive between the plate sections and flange, said spring housing plates having the radially outer portions thereof overlapping the opposite sides of the radially inner portions of the clutch plate sections and disposed so that each pair of associated housing plates spans the adjoining ends of adjacent clutch plate sections, means for securing the associated pairs of spring housing plates together with the clutch plate sections held therebetween so as to form an annulus substantially concentric with the hub, and rings of friction material supported on opposite sides of the annulus in concentric relation with the hub and secured to all of said plate sections.

5. A clutch plate comprising a center hub having an annular flange, said flange having openings provided therein in circumferentially spaced relation, a ring encircling the periphery of said flange and movable rotatably with respect thereto, a plurality of clutch plate sections circumferentially arranged around the flange having arcuate attaching portions around the flange having arcuate attaching portions on the inner margin thereof overlapping said ring, spring housing plates disposed on opposite sides of the flange covering the openings therein having arcuate attaching portions on the outer margin thereof overlapping opposite sides of the ring, the attaching portions of the clutch plate sections and the attaching portions of the spring housing plates being in mutually overlapping relation, means for securing the overlapping attaching portions together and to the ring to form an annulus substantially concentric with the hub, and spring means in the openings in said flange and enclosed by the spring housing plates for resiliently transmitting drive between the annulus and hub, the clutch plate sections being adapted to carry friction material on the radially outer portions thereof.

6. A clutch plate comprising a center hub having an annular flange, said flange having openings provided therein in circumferentially spaced relation, a ring encircling the periphery of said flange and movable rotatably with respect thereto, a plurality of clutch plate sections circumferentially arranged around the flange having arcuate attaching portions around the flange having arcuate attaching portions on the inner margin thereof overlapping said ring, spring housing plates disposed on opposite sides of the flange covering the openings therein having arcuate attaching portions on the outer margin thereof overlapping opposite sides of the ring, the attaching portions of the clutch plate sections and the attaching portions of the spring housing plates being in mutually overlapping relation, means for securing the overlapping attaching portions together and to the ring to form an annulus substantially concentric with the hub, spring means in the openings in said flange and enclosed by the spring housing plates for resiliently transmitting drive between the annulus and hub, and rings of friction material supported on opposite sides of the annulus in substantially concentric relation with the hub and secured to all of said plate sections.

7. A clutch plate as set forth in claim 5, wherein the ring encircling the hub flange is of sectional construction and comprises a plurality of circumferentially arranged ring segments disposed so that the adjoining ends of each pair of neighboring segments are spanned by the arcuate attaching portions of a pair of associated spring housing plates.

8. A clutch plate as set forth in claim 5, wherein the clutch plate sections are so disposed with relation to the spring housing plates so that the adjoining ends of the arcuate attaching portions of neighboring plate sections are spanned by the arcuate attaching portions of a pair of associated spring housing plates.

9. A clutch plate as set forth in claim 5, wherein each of the clutch plate sections has one end of the arcuate attaching portion thereof bent into offset parallel relationship to the rest of the attaching portion and arranged to overlap and be secured to the adjoining end of the arcuate attaching portion on the next clutch plate section.

10. A clutch plate comprising a center hub having an annular flange, a plurality of clutch plate sections of sheet spring material circumferentially arranged around the flange, the flange having circumferentially spaced openings provided therein, spring means disposed in said openings for resiliently transmitting drive between the plate sections and the flange, a plurality of circumferentially spaced spring housing plates made from other sheet metal disposed on opposite sides of the flange having housing portions struck from the plane thereof covering the openings and enclosing said spring means, said housing portions being arranged for engagement with the spring means to transmit drive between the plate sections and flange, said spring housing plates having flat radially outer portions overlapping flat radially inner portions of the clutch plate sections, the clutch plate sections having the radially outer portions thereof formed to provide yieldable resilient facing supporting portions axially spaced relative to the plane of the flat radially inner portions thereof, and means for securing the plate sections together and to said spring housing plates to form an annulus concentric with the hub and flange, said plate sections being adapted to carry friction material on the radially outer portions thereof.

11. A clutch plate comprising a center hub having an annular flange, a plurality of clutch plate sections of sheet spring material circumferentially arranged around the flange, the flange having circumferentially spaced openings provided therein, spring means disposed in said openings for resiliently transmitting drive between the plate sections and the flange, a plurality of circumferentially spaced spring housing plates made from other sheet metal disposed on opposite sides of the flange having housing portions struck from the plane thereof covering the openings and enclosing said spring means, said housing portions being arranged for engagement with the spring means to transmit drive between the plate sections and flange, said spring housing plates having flat radially outer portions overlapping flat radially inner portions of the clutch plate sections, the clutch plate sections having the radially outer portions thereof formed to provide yieldable resilient facing supporting portions axially spaced relative to the plane of the flat radially inner portions thereof, means for securing the plate sections together and to said spring housing plates to form an annulus concentric with the hub and flange, and rings of friction facing material supported on opposite sides of the annulus in substantially concentric relation with the hub and secured to said axially spaced outer portions.

12. A clutch plate comprising a center hub having an annular flange, a plurality of clutch plate sections of sheet spring material circumferentially arranged around the periphery of the flange, said flange having openings provided therein in circumferentially spaced relation, spring housing plates made from other sheet metal disposed on opposite sides of said flange having spring housing portions struck from the planes thereof at circumferentially spaced points and registering with the openings in the flange, spring means in said openings and enclosed by said housing portions and active between the flange and the adjacent portions of the spring housing plates for resiliently transmitting drive between the plates and hub, said plates having flat radially outer edge portions overlapping opposite sides of flat radially inner edge portions of the clutch plate sections, and means for securing said overlapped portions together so as to secure the spring housing plates in assembled relation to one another on opposite sides of the hub, the clutch plate sections having the radially outer portions thereof formed to provide yieldable resilient facing supporting portions axially spaced relative to the plane of the flat radially inner portions thereof, said plate sections being adapted to carry friction material on the radially outer portions thereof.

13. A clutch plate comprising a center hub having an annular flange, a plurality of clutch plate sections of sheet spring material circumferentially arranged around the periphery of the flange, said flange having openings provided therein in circumferentially spaced relation, spring housing plates made from other sheet metal disposed on opposite sides of said flange having spring housing portions struck from the planes thereof at circumferentially spaced points and registering with the openings in the flange, spring means in said openings and enclosed by said housing portions and active between the flange and the adjacent portions of the spring housing plates for resiliently transmitting drive between the plates and hub, said plates having flat radially outer edge portions overlapping opposite sides of flat radially inner edge portions of the clutch plate sections, means for securing said overlapped portions together so as to secure the spring housing plates in assembled relation to one another on opposite sides of the hub, the clutch plate sections having the radially outer portions thereof formed to provide yieldable resilient facing supporting portions axially spaced relative to the plane of the flat radially inner portions thereof, and rings of friction facing material supported on opposite sides of the annulus in substantially concentric relation with the hub and secured to said axially spaced outer portions.

14. A clutch plate comprising a center hub having an annular flange, a plurality of clutch plate sections of sheet spring material circumferentially arranged around the periphery of the flange, said flange having openings provided therein in circumferentially spaced relation, spring housing plates made from other sheet metal disposed on opposite sides of said flange having spring housing portions struck from the planes thereof at circumferentially spaced points and registering with the openings in the flange, spring means in said openings and enclosed by said housing portions and active between the flange and the adjacent portions of the spring housing plates for resiliently transmitting drive between the plates and hub, said clutch plate sections having flat radially inner edge portions for attachment thereof to said spring housing plates, and means for securing the spring housing plates and clutch plate sections together as a unitary assembly for relative rotary movement with respect to the hub flange, the clutch plate sections having the radially outer portions thereof formed to provide yieldable resilient facing supporting portions axially spaced relative to the plane of the flat radially inner portions thereof, said plate sections being adapted to carry friction material on the radially outer portions thereof.

15. A clutch plate comprising a center hub having an annular flange, a plurality of clutch plate sections of sheet spring material circumferentially arranged around the periphery of the flange, said flange having openings provided therein in circumferentially spaced relation, spring housing plates made from other sheet metal disposed on opposite sides of said flange having spring housing portions struck from the planes thereof at circumferentially spaced points and registering with the openings in the flange, spring means in said openings and enclosed by said housing portions and active between the flange and the adjacent portions of the spring housing plates for resiliently transmitting drive between the plates and hub, said clutch plate sections having flat radially inner edge portions for attachment thereof to said spring housing plates, means for securing the spring housing plates and clutch plate sections together as a unitary assembly for relative rotary movement with respect to the hub flange, the clutch plate sections having the radially outer portions thereof formed to provide yieldable resilient facing supporting portions axially spaced relative to the plane of the flat radially inner portions thereof, and rings of friction facing material supported on opposite sides of the annulus in substantially concentric relation with the hub and secured to said axially spaced outer portions.

GEORGE H. JOHNSON.